United States Patent
Matsushima et al.

(10) Patent No.: US 8,437,228 B2
(45) Date of Patent: May 7, 2013

(54) THERMALLY-ASSISTED MAGNETIC RECORDING HEAD

(75) Inventors: Naoki Matsushima, Chiba (JP); Satoshi Arai, Yokohama (JP); Takuya Matsumoto, Sunnyvale, CA (US); Jun-ichiro Shimizu, Hadano (JP); Irizo Naniwa, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 120 days.

(21) Appl. No.: 13/057,585

(22) PCT Filed: Jun. 9, 2009

(86) PCT No.: PCT/JP2009/060500
§ 371 (c)(1),
(2), (4) Date: Apr. 21, 2011

(87) PCT Pub. No.: WO2010/016329
PCT Pub. Date: Feb. 11, 2010

(65) Prior Publication Data
US 2011/0205865 A1    Aug. 25, 2011

(30) Foreign Application Priority Data

Aug. 6, 2008 (JP) ................................. 2008-202545

(51) Int. Cl.
*G11B 11/00* (2006.01)
(52) U.S. Cl.
USPC .................. 369/13.17; 369/13.13; 369/13.33
(58) Field of Classification Search .............. 369/13.13, 369/13.17
See application file for complete search history.

(56) References Cited

U.S. PATENT DOCUMENTS

| | | | |
|---|---|---|---|
| 5,566,157 A | * | 10/1996 | Kojima et al. ........... 369/112.07 |
| 6,771,589 B2 | | 8/2004 | Ueyanagi et al. |
| 7,864,635 B2 | | 1/2011 | Shimizu |

(Continued)

FOREIGN PATENT DOCUMENTS

| JP | 2001-319365 A | 11/2001 |
|---|---|---|
| JP | 2002-50073 A | 2/2002 |

(Continued)

OTHER PUBLICATIONS

Japanese Notice of Reasons for Rejection dated May 29, 2012 (one (1) page).

(Continued)

*Primary Examiner* — Wayne Young
*Assistant Examiner* — Brenda Bernardi
(74) *Attorney, Agent, or Firm* — Crowell & Moring LLP

(57) ABSTRACT

A thermally assisted magnetic recording head with highly efficient optical coupling, while guiding a laser beam from a semiconductor laser element, i.e., a light source, to a leading end thereof, eliminating an influence due to heat generated by the element, and having excellent floating characteristics. The thermally assisted magnetic recording head includes a substrate 2 having a first optical waveguide 1, a semiconductor laser element 100, and a slider 4 having a second optical waveguide 3 formed on an end surface. The semiconductor laser element 100 is fixed on the substrate 2 so that light emitted from the element 100 propagates through the first optical waveguide 1 and a slider 4 is fixed on the substrate 2 so that light emitted from the first optical waveguide 1 propagates through the second optical waveguide 3. High optical coupling efficiency is then achieved, while ensuring both heat-dissipating and floating characteristics.

15 Claims, 7 Drawing Sheets

U.S. PATENT DOCUMENTS

| | | | |
|---|---|---|---|
| 2001/0040868 A1* | 11/2001 | Ueyanagi et al. | 369/300 |
| 2003/0099065 A1 | 5/2003 | Watanabe | |
| 2004/0021237 A1* | 2/2004 | Shimizu et al. | 264/1.28 |
| 2005/0018547 A1 | 1/2005 | Akiyama et al. | |
| 2006/0187564 A1* | 8/2006 | Sato et al. | 360/59 |
| 2008/0056073 A1* | 3/2008 | Shimizu | 369/13.02 |
| 2008/0117727 A1* | 5/2008 | Matsumoto | 369/44.14 |
| 2008/0130155 A1* | 6/2008 | Naniwa et al. | 360/59 |
| 2009/0185459 A1* | 7/2009 | Matsumoto | 369/13.02 |
| 2009/0244778 A1 | 10/2009 | Hasegawa et al. | |

FOREIGN PATENT DOCUMENTS

| | | |
|---|---|---|
| JP | 2002-237018 A | 8/2002 |
| JP | 2002-298302 A | 10/2002 |
| JP | 2003-162875 A | 6/2003 |
| JP | 2006-185548 A | 7/2006 |
| JP | 2007-95167 A | 4/2007 |
| JP | 2008-16096 A | 1/2008 |
| JP | 2008-59645 A | 3/2008 |
| JP | 2008-130165 A | 6/2008 |
| WO | WO 2008/081909 A1 | 7/2008 |

OTHER PUBLICATIONS

International Search Report including English translation dated Jul. 21, 2009 (Two (2) pages).

Japanese language Reason for Rejection dated Aug. 21, 2012 (two (2) pages).

* cited by examiner

THERMALLY-ASSISTED MAGNETIC RECORDING HEAD

INCORPORATION BY REFERENCE

The present application claims priority from Japanese application JP 2008-202545 filed on Aug. 6, 2008, the content of which is hereby incorporated by reference into this application.

TECHNICAL FIELD

The present invention relates to a magnetic recording medium and a thermally assisted magnetic recording head including means of writing data in the recording medium by using a magnetic field and means of heating the recording medium by using laser light.

BACKGROUND ART

Along with the prowess of recent information-oriented society, voices or videos with high precision advance and also a data communication amount of the Internet significantly increases. Along with the above-described facts, an electronic data amount accumulated in a server increases and an information recording system with a large capacity is demanded as an information recording apparatus. In an optical disk drive apparatus or hard disk drive apparatus equipped on a personal computer, a recorder, a camera or the like, higher recording density for storing vast information is demanded. The above-described higher recording density represents that a recorded bit size of a disk is made very small.

For the purpose of attaining the higher recording density of the hard disk, a distance between a recording medium and a head need be narrowed down and a crystal particle size of a magnetic film of a magnetic recording medium need be pulverized. There is a thermal fluctuation problem that in the magnetic recording medium, when a crystal particle size is pulverized, particles become thermally unstable. In recent years, the above-described problem is actualized as a main factor of an inhibition in the higher recording density. For the purpose of pulverizing crystal particle sizes, and at the same time, attaining thermal stability, it is effective to enlarge coercivity. When the coercivity increases, a magnetic field strength of a magnetic head necessary for the recording need be increased. However, solid state properties of magnetic materials used for the recording head is limited and there is a limit to reduction in a distance between the magnetic disk and the recording head, and therefore, it is difficult to increase the coercivity along with the higher recording density. To solve the above-described problem, there is proposed an optical/magnetic hybrid recording technology in which an optical recording and a magnetic recording are fused with each other. An applied magnetic field during the recording operation is generated and at the same time, a medium is heated, thus reducing coercivity thereof. This process makes it easy to perform a recording operation also on a recording medium with high coercivity, in which a recording magnetic field strength is short and the recording operation is hard to be performed in a conventional magnetic head. For the reproducing operation, a magneto resistive effect used in a conventional magnetic recording is used. The above-described hybrid recording method is referred to as a thermally assisted magnetic recording. As a heating method using light, a method for using near-field is herein proposed. In the thermally assisted magnetic recording using the near-field, laser light generated by a laser light source is guided to a recording head, and its light spot diameter is converted into a size and form suited to the recording operation to be used by using an element (hereinafter, referred to as a near-field light generation element) having a function of generating the near-field light.

For the laser light source, a semiconductor laser element which is compact and has low power consumption among laser light source elements is normally used in view of the need for use within a package of a disk drive. When using the semiconductor laser element in a thermally assisted magnetic recording apparatus using the near-field light for realizing a recording density of $Tb/in^2$ or more, an output power of approximately several mW is required before reaching a recording medium surface.

Optical components guiding laser light generated by LD to a near-field light generation element mean optical components such as a reflection mirror, a lens, an optical waveguide and the like. Light generated by the LD passes through optical components disposed on an optical path and reaches the near-field light generation element or a posterior recording medium. When passing through the optical path, its light intensity is attenuated and reduced to one over several tens of light output generated by the LD. A main cause of attenuation of the light intensity includes absorption loss and scattering loss at the time of passing through optical components, and coupling loss due to a displacement from an ideal position generated at the time of adhering the optical components. As a result, in the thermally assisted magnetic recording apparatus, there is required a configuration in which the optical coupling loss up to the incidence into the near-field light generation element is reduced.

On the other hand, in the slider of the hard disk, miniaturization from a pico slider to a femto slider is advanced. Further, in an air bearing surface, a floating quantity is also reduced up to approximately 10 nm. It is also expected that the miniaturization is further advanced from this time and the air bearing surface is reduced. However, there arises a problem of a warpage of the slider itself when the miniaturization is advanced and the floating quantity is reduced. For the purpose, in addition to the problem that the above-described optical coupling loss is reduced, there is required a configuration in which a warpage of the slider is suppressed.

In JP-A-2002-298302 (hereinafter, referred to as Patent Literature 1), there is provided the thermally assisted magnetic recording head which achieves low noise of a medium, securement of resistance to thermal disturbance, and recording by a practical recording head when disposing an optical fiber on the slider having formed therein a groove, and through an optical prism on an end surface of the slider, making laser light incident into a pair of structures facing each other through a gap being used both as a near-field probe and a magnetic writing head. In JP-A-2006-185548 (hereinafter, referred to as Patent Literature 2), there is provided the thermally assisted magnetic recording head which realizes reduction in size and weight when a recording magnetic pole, a magnetic recording element, a magnetic reproducing element, an optical waveguide, and an opening are attached onto a floating slider provided at a lower side of a suspension, and a laser diode is arranged at an opposite side of the suspension. Also, there is described a configuration in which an optical waveguide and a semiconductor laser element are vertically disposed in the same direction as that of the slider. In JP-A-2007-95167 (hereinafter, referred to as Patent Literature 3), there is provided the thermally assisted magnetic recording head which is capable of being made thin in thickness by using a simple configuration when a semiconductor laser, an optical waveguide, and a diffraction element functioning as a near-field light generation element and a slider is provided on a suspension, and a laser beam emitted from the semiconductor laser element propagates through the optical waveguide, and is converged by the diffraction element, thereby irradiating a plasmon probe.

Citation List

Patent Literature

Patent Literature 1: JP-A-2002-298302
Patent Literature 2: JP-A-2006-185548
Patent Literature 3: JP-A-2007-95167

SUMMARY OF INVENTION

Technical Problem

In a conventional technology discussed in the above-described Patent Literature 1, light is guided up to a slider end through an optical fiber. As to the disposition for fixing a laser light source and the optical fiber, suggestions are not given; however, there is a big problem that when they are mounted on a suspension or an arm, the optical fiber is routed up to the slider. In addition, the optical fiber has high rigidity and therefore disturbs movement of the floating slider according to the waviness of the magnetic disk. As a result, there are a number of problems regarding floating characteristics in the above-described configuration.

There is a problem that in a conventional technology discussed in the above-described Patent Literature 2, since the thermally assisted magnetic recording head has a configuration in which light is guided to an optical waveguide through a thickness of the suspension or that of the connection material to the suspension, the optical coupling efficiency is deteriorated. Further, there is a big problem that the slider is generally operated extremely small by using a dimple; however, in the above-described configuration, since laser diode light does not follow a magnetic disk, the optical coupling efficiency is deteriorated. On the other hand, when a sub-mount is provided on the slider side, the slider follows the magnetic disk without problems. In general, there is a big size problem that since an LD length (resonator length) of approximately 500 µm is required, the thickness becomes thick. Further, suggestions are not given as to the heat dissipating characteristics of the semiconductor laser element, and connection materials between the suspension and the slider as well as those between the slider and the sub-mount. In a conventional technology discussed in the above-described Patent Literature 3, the thermally assisted magnetic recording head has a configuration in which an optical waveguide is disposed on the suspension, and the slider is connected to the suspension. The slider has no function of being operated according to twisting or bending as in a conventional dimple, and therefore, there are a number of problems from a standpoint of the floating characteristics. In addition, a translucent flat plate made of resins or quartz is proposed for the slider. However, the translucent flat plate is hard to be substituted for the heretofore-used AlTiC from a standpoint of machining accuracy, rigidity and price.

To cope with the above-described problems, the present invention provides the thermally assisted magnetic recording head which is capable of responding high density and high-speed recording operation when light from the semiconductor laser element efficiently propagates through the optical waveguide in the vicinity of the magnetic head, while ensuring the heat dissipating characteristics and the floating characteristics.

Solution to Problem

To accomplish the above-described objects, according to one aspect of the present invention, there is provided a thermally assisted magnetic recording head. The thermally assisted magnetic recording head includes a substrate; a semiconductor laser element which is provided on the substrate and generates laser light; and a slider including a near-field light generation element which receives the laser light and generates near-field light, a magnetic head which performs a recording operation, and an air bearing surface, wherein a first optical waveguide through which the laser light emitted from the semiconductor laser element propagates is provided on the substrate; and the slider is provided on the first optical waveguide, and has, on its end surface, a second optical waveguide which propagates, in a thickness direction of the slider, the laser light propagating through the first optical waveguide and guides it to the near-field light generation element.

Advantageous Effects of Invention

According to the present invention, when the semiconductor laser element and the slider are mounted on a first substrate having formed thereon the optical waveguide, the semiconductor laser element can be disposed in the vicinity of the magnetic head, while ensuring the heat dissipating characteristics. This process permits light from the semiconductor laser element to efficiently propagate through the optical waveguide. Further, since a thermally assisted magnetic recording head has a configuration in which a warpage of the slider can be suppressed, the preferable floating characteristics can be secured. As can be seen from the above description, there can be realized the thermally assisted magnetic recording head in which the thickness does not become so thick and which has a compact configuration and is capable of responding high density and high-speed recording operation.

DESCRIPTION OF EMBODIMENTS

Embodiments of the present invention will be described below.

Main components of a thermally assisted magnetic recording head necessary for attaining a thermally assisted magnetic recording according to the present invention include a semiconductor laser element, a substrate having formed thereon an optical waveguide, and a slider having an optical waveguide, a near-field light generation element, and a magnetic field generation element.

A semiconductor laser element reaches a high temperature during operation, and a temperature at that time has a close relationship with a luminescence characteristic and a lifetime. Accordingly, for the purpose of ensuring heat dissipating characteristics, the thermally assisted magnetic recording head preferably has a junction-down structure in which an active layer is disposed in a position near a substrate connection surface with regard to the connection between the semiconductor laser element and the substrate on which it is mounted. Between the semiconductor laser element and the substrate, Au—Sn solder with extremely small creep deformation is preferably used for preventing a relative position with an optical waveguide which propagates light from deteriorating with age. In addition, there is a problem that when the preferable heat dissipating characteristics cannot be ensured, a warpage occurs on the slider depending on its operation in addition to the fact that a lifetime of the semiconductor laser element is shortened. When a level of the above-described warpage increases, floating characteristics are deteriorated.

From the above-described fact, the thermally assisted magnetic recording head must efficiently dissipate heat such that the semiconductor laser element and the slider do not reach a high temperature. Accordingly, as a material of the substrate, there is preferably used a material having high thermal conductivity and a thermal expansion coefficient close to those of one material (GaAs) of the semiconductor laser element and another material (AlTiC) of the slider. Concretely, a material of the substrate may be selected coupled with workability from SiC, $Al_2O_3$, AlN, Si, and AlTiC. A thickness of the substrate is preferably selected from approximately 100 to 200 μm in view of the floating characteristics and the rigidity.

On one end surface of the slider, an optical waveguide is provided so as to penetrate from a top surface to bottom surface of the slider in the thickness direction of the slider. Further, a near-field light generation element is provided on an ABS (Air Bearing Surface) of the slider. AlTiC is conventionally used as a material of the slider. It is important that the above-described constructional elements are fixed at high accuracy by using an adhesive and a connection material such as solder.

First Embodiment

A first embodiment of the present invention will be described with reference to FIG. 1.

Figure 1:
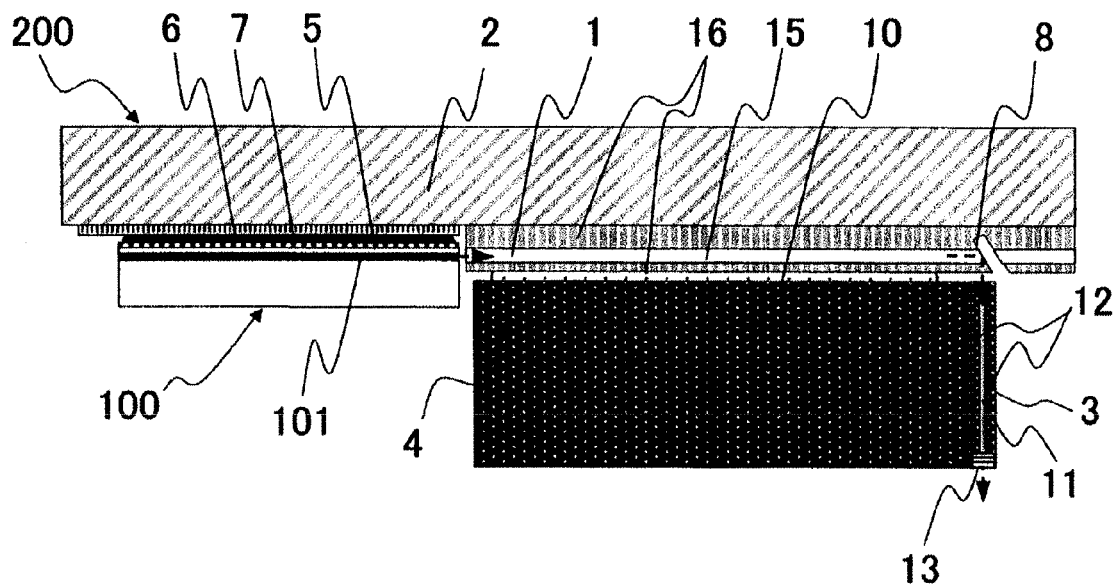
[FIG. 1] A schematic diagram illustrating a first embodiment of the present invention.

FIG. 1 illustrates a thermally assisted magnetic recording head on which the semiconductor laser element 100 and the slider 4 having a second optical waveguide 3 formed on end surface are mounted on the substrate 2 on which a first optical waveguide 1 is formed.

The semiconductor laser element 100 is provided in a position in which the first optical waveguide 1 is not formed on the substrate 2. A light emitting part of the semiconductor laser element 100 is designed to be disposed approximated to one end of the first optical waveguide 1 and efficiently propagate a light beam emitted from the semiconductor laser element 100 through the first optical waveguide 1. In the positioning, the semiconductor laser element 100 need be disposed at high accuracy so as to make a light beam incident into the optical waveguide 1 as efficiently as possible. One positioning mark is prepared on the substrate 2, and further another positioning mark is prepared also on the semiconductor laser element 100, thereby positioning them on the basis of the positioning marks. At this time, the semiconductor laser element 100 can be mounted on the substrate 1 at high accuracy by using the following positioning marks. That is, the one positioning mark of the substrate 2 is prepared at a process of forming a core pattern of the optical waveguide 1, and the another positioning mark of the semiconductor laser element 100 is prepared at a process of forming a mesa structure of the semiconductor laser element 100.

In the present embodiment, the semiconductor laser element 100 has a configuration in which both of a p-type electrode and n-type electrode of its electrode 5 are provided on the side of joining it to the substrate 2. The electrode 5 of the semiconductor laser element 100 and an electrode 6 of the substrate 2 are electrically connected through solder 7, while paying attention so as not to contact the p-type electrode with the n-type electrode. For example, the following method except for the above-described method may be used as an electrode connection method of the semiconductor laser element 100. That is, the p-type electrode is connected to the electrode 6 of the substrate 2 through solder, and on the other hand, the n-type electrode is formed on a surface of the side opposite to that of joining the semiconductor laser element 100 to the substrate 2 and then, the n-type electrode is connected to an electrode 6 formed on the substrate 2 by using wire bonding techniques. Note that the bonding wire is prevented from being contacted with the slider or the magnetic disk.

Figure 2:
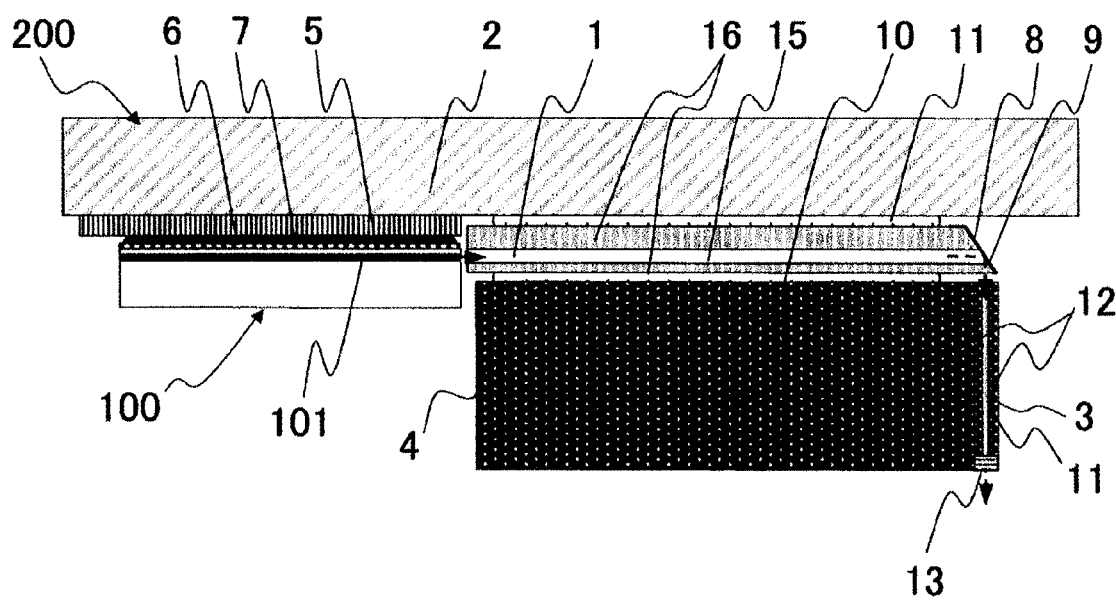
[FIG. 2] A schematic diagram illustrating a variation according to the first embodiment of the present invention.

A mirror 8 which converts a propagation direction of light is formed on another end of the first optical waveguide 1. A conversion angle of a light beam by using the mirror 8 preferably varies from 60 to 120 degrees, and more preferably from 85 to 95 degrees. In the present embodiment, as a material of the optical waveguide 1, polymer with high transmissivity is used with respect to a wavelength of laser light. As its formation procedure, an underclad layer 16, a core pattern 15, and an overclad layer 16 are sequentially laminated and formed. A formation method of the core pattern 15 includes various methods such as an exposure and development method, a photobleaching method, and a dry etching method, and any method thereof may be used. Further, as illustrated in FIG. 2, there may be used a method for previously forming a film-like optical waveguide composed of an underclad layer/a core pattern/an overclad layer and mounting it on the substrate 2 by using a joining method such as an adhesive 11. As to a material of the polymer optical waveguide, a material exhibits preferable transmittance of laser light and is preferably capable of rigid control over a refractive index. Examples preferably include materials composed mainly of fluorinated polyimide, epoxy resin, acrylate resin, and silicone resin. In addition, a material composed mainly of, for example, quartz except for polymer may be used as a material of the optical waveguide 1.

Figure 3:
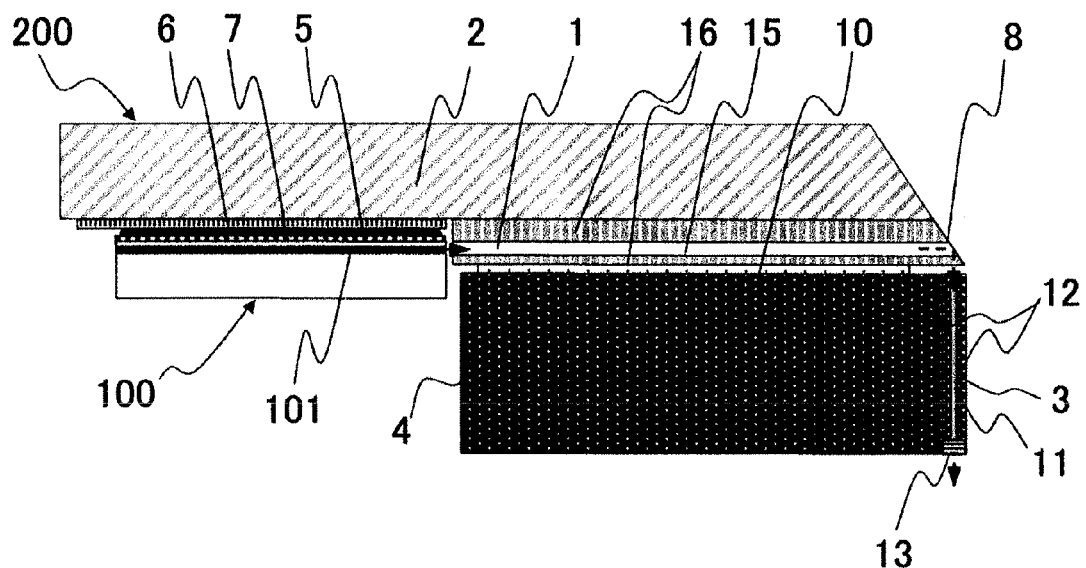
[FIG. 3] A schematic diagram illustrating a variation according to the first embodiment of the present invention.

In the present embodiment, the mirror 8 is formed by obliquely grinding the optical waveguide 1 by using dicing. As a method for grinding the optical waveguide, a dry etching method and a wet etching method except for the dicing may be used. Further, as illustrated in FIG. 3, the thermally assisted magnetic recording head may have a configuration in which not only the optical waveguide 1 but also the substrate 2 is cut. When the thermally assisted magnetic recording head has a configuration in which the optical waveguide film 1 is attached to the substrate 2 as illustrated in FIG. 2, a method for forming a mirror groove before attaching the optical waveguide film 1 to the substrate 2, or cutting the substrate 2 into an inclination of 45 degrees may be used. Note that in this case, when an adhesive is attached to a surface of the mirror 8, a refractive index difference is extremely reduced to prevent light from being reflected. Therefore, an adhesive need be applied to the mirror surface so as not to be protruded, or a metal film 9 need be previously formed on the mirror surface as illustrated in FIG. 2 so as to reflect light regardless of the presence or absence of the adhesive.

On the first optical waveguide 1 formed on the substrate 2, a slider 4 having a second optical waveguide 3 formed on an end surface is provided. The second optical waveguide 3 is formed on an end surface of the slider 3 in the same direction as that of the side on which the mirror surface is formed on the first optical waveguide 1. Light whose propagation direction is converted by the mirror 8 propagates through the second optical waveguide 3 formed on the slider 4 and reaches a near-field optical element 13. For the purpose of efficiently propagating light from the first optical waveguide 1 to the second optical waveguide 3, the slider 4 need also be mounted on the substrate 2 at high accuracy in the same manner as in the semiconductor laser 100. By passive alignment technology, the slider 4 is mounted on the substrate 2 by using one core of the first optical waveguide 1 and another core of the second optical waveguide 3 as the positioning mark. At this time, the positioning marks are formed at the same process as a core formation process of each optical waveguide, and the slider 4 may be mounted on the substrate 2 by using them as a guide. On the other hand, there can be used so-called active alignment technology in which when a current can be allowed to flow through the semiconductor laser element 100, the positioning is performed such that an output of light emitted from the second optical waveguide 3 is maximized. Any one of the above-described technologies may be used as the positioning method.

The slider 4 is joined to the substrate 2 by using an adhesive. The adhesive 10 is applied to a surface of the substrate 2 contacted with the slider 4, and the slider 4 is mounted thereon. In the present hard disk, a floating quantity of the slider 4 is approximately 10 nm. Therefore, when a warpage of several nm occurs nonuniformly, floating characteristics are deteriorated. In addition, a thickness of the slider is extremely thinned at 230 μm, and when the slider is subjected to a thermal stress, a warpage is easy to occur. To cope with the above-described problem, for the purpose of minimizing a warpage of the slider 4, an adhesive with low elasticity modulus and low hardness need be used as the adhesive 10. Concretely, solid state properties having an elasticity modulus of 100 MPa or less and shore A hardness of 50 or less at room temperature are preferable.

After positioning of the slider is performed, the adhesive 10 is cured and the slider 4 is fixed on the substrate 2. In the present embodiment, as the adhesive 10, there is used a conductive adhesive obtained by adding functions of UV light curing and thermosetting type at the same time. After the positioning, ultraviolet light is irradiated onto the adhesive 10 and the slider 4 is temporarily fixed on the substrate 2. Then, unless the slider 4 is contacted, it does not move with respect to the substrate 2. Thereafter, baking is performed and the adhesive 10 is formally cured, thereby perfectly fixing the slider 4 on the substrate 2.

The adhesive 10 may be separately formed, with a heat curing adhesive formed on a surface part of an adhesive part and an UV light curing adhesive formed on an end part of the adhesive part. At this time, the UV light curing adhesive carries out a function of temporarily fixing the slider 4 on the substrate 2 and the heat curing adhesive carries out a function of formally joining the slider 4 to the substrate 2. In addition, a dam structure may be provided on the slider 4 by using solder so as not to protrude the adhesive 10 into an optical coupling portion of both the optical waveguides.

Concretely, the adhesive 10 preferably has a thickness of 20 μm or less as thin as possible. As a thickness of the adhesive 10 is thinner, a distance between an exiting end of the first optical waveguide 1 and an incident end of the second optical waveguide 3 becomes shorter, and as a result, an optical coupling efficiency is improved.

As an adhesive surface of the substrate 2, the slider 4 may be provided either on an overcladding surface of the optical waveguide or on a surface of the substrate 2 with no overcladding layer of the optical waveguide. The former method exerts an effect capable of thinning a thickness of the adhesive 10 as far as possible. On the other hand, the latter method exerts an effect of being excellent in the heat dissipating characteristics.

Figure 11A:
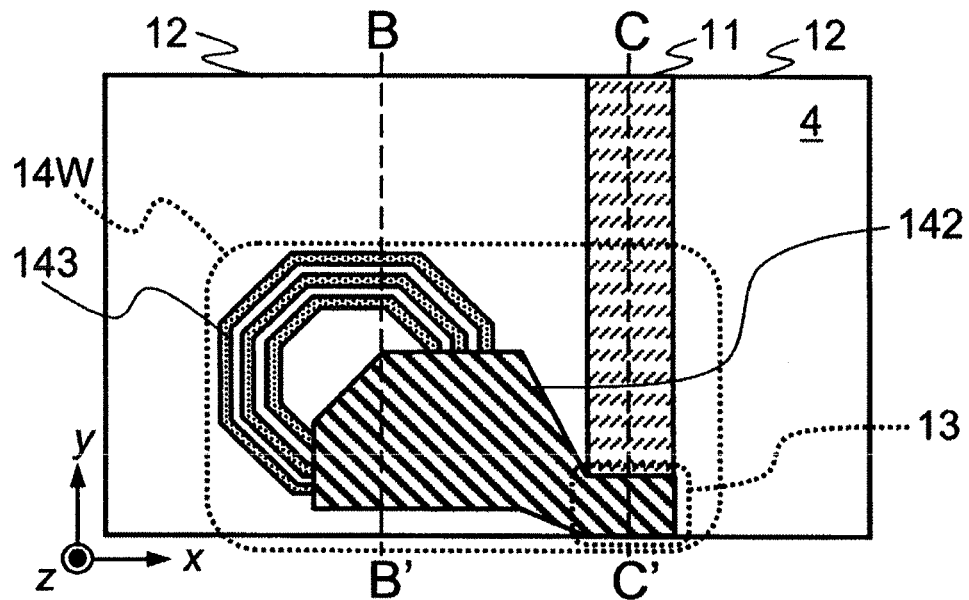
[FIG. 11A] A diagram illustrating a slider according to an embodiment of the present invention.
Figure 11B:
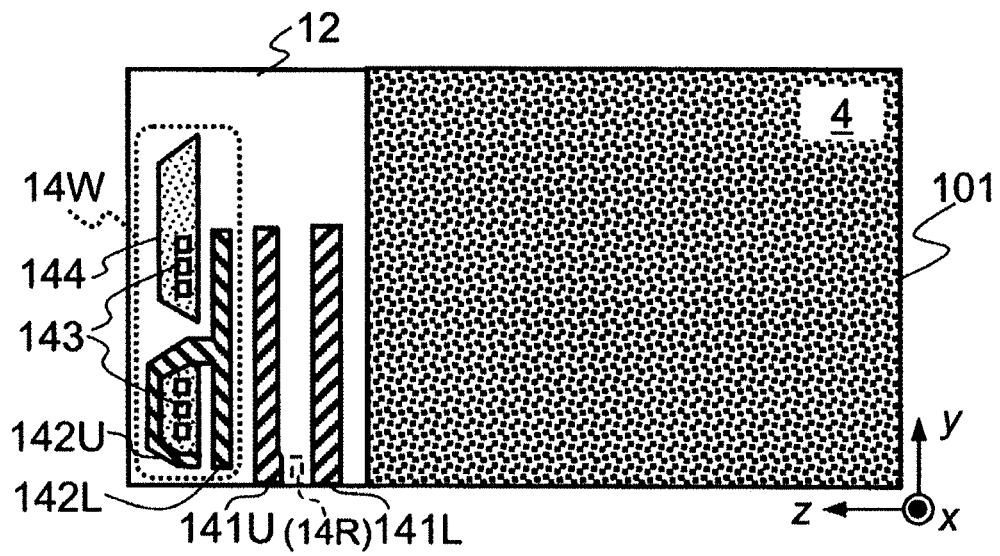
[FIG. 11B] A diagram illustrating the slider according to the embodiment of the present invention.
Figure 11C:
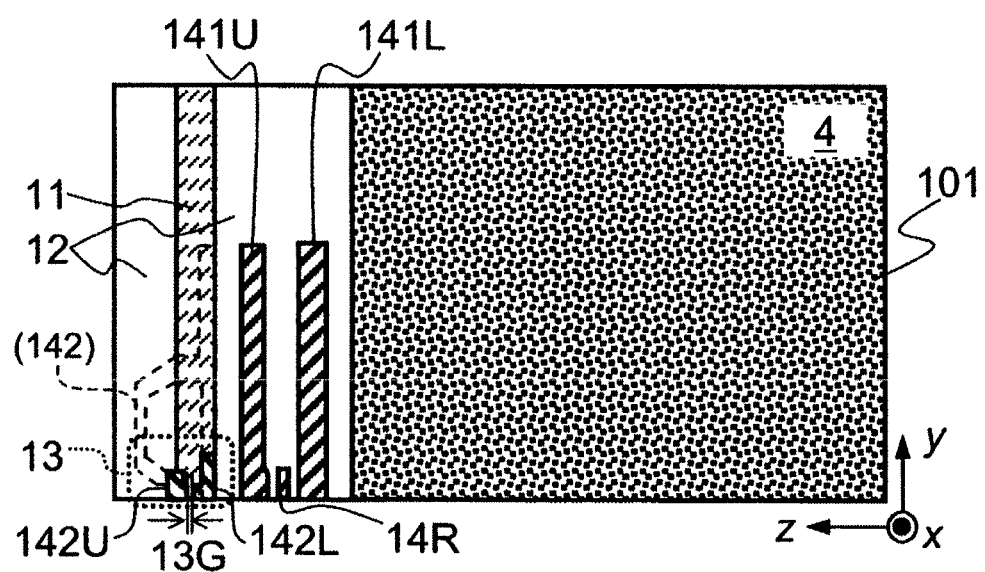
[FIG. 11C] A diagram illustrating the slider according to the embodiment of the present invention.

FIGS. 11A to 11C illustrate one example of the slider 10 with an optical waveguide 3. FIG. 11A illustrates an end surface (X-Y plane) opposed to the substrate 2 having mounted thereon a semiconductor laser element 100 along with perspective images of both of a near-field light generation element 13 formed in the vicinity of the end surface and a magnetic field generation element (hereinafter, referred to as a writing element) 14W for writing information in a recording medium. FIG. 11B is a y-z plane view illustrating the slider 4 crossed, in the z-axis direction, along a B-B' line of FIG. 11A. Further, FIG. 11C is a y-z plane view illustrating the slider 4 crossed, in the z-axis direction, along a C-C' line of FIG. 11A. The recording medium (not illustrated) (tracks of a magnetic disk) proceeds to a direction of an "arrow" indicating the z-axis with respect to the slider 4. Also, this arrow indicates a growth direction of thin films of the magnetic field generation element 14 and near-field light generation element 13 formed on the base material 101 of the slider 4.

On a main surface (a x-y plane) of the base material 101 composed of a nonmagnetic material such as AlTiC ($Al_2O_3$—TiC), the magnetic field generation element (hereinafter, referred to as a read element) 14R for reading information from the recording medium and the write element 14W doubling as the near-field light generation element 13 are sequentially formed, and separated from each other by dielectric films (insulating films) 11 and 12. Specifically, the read element 14R and the write element 14W are sequentially opposed to tracks of the magnetic disk (not illustrated). Then, the track opposed to the write element 14W receives a magnetic signal (write signal) therefrom, and at the same time, is irradiated by near-field light caused by the near-field light generation element 13 which is provided in parallel with the write element 14W.

The read element 14R may be configured as a GMR (Giant Magneto Resistive) effect or a TMR (Tunnel Magneto Resistive) effect. In the former read element 14R, an antiferromagnetic layer such as MnIr (manganese/iridium), a laminated ferri-structure obtained by sandwiching a Ru (ruthenium) film in the z-axis direction by using a CoFe (cobalt/ferrum) film, an oxidation prevention layer composed of Cu (copper), and a current constricting-layer composed of CoFe and oxides thereof are laminated and configured in this order from the base material 101 side. Above and below the read element 14R, an upper shield layer 141U and a lower shield layer 141L are separated and formed by the dielectric film (insulating film) 12, respectively. The above-described shield layers 141U and 141L are formed by a soft magnetic material such as NiFe (nickel/ferrum), CoZrNb (cobalt/zirconium/niobium), CoFe, and CoNiFe.

The write element 14W includes a yoke 142 having an upper magnetic pole 142U and a lower magnetic pole 142L, and a coil 143 which generates a magnetic field (magnetic signals) between the magnetic poles 142U and 142L. The coil 143 is made of nonmagnetic metallic materials such as Au (gold), Ag (silver), Cu, Cr (chromium), Al (aluminum), Ti (titanium), NiP (nickel/phosphorus), Mo (molybdenum), Pd (palladium), and Rh (rhodium), embedded in an organic insulating film 144 composed of polyimide and polycarbonate, and separated from the yoke (magnetic poles) 142. The yoke 142 is formed by the same soft magnetic material as that of, for example, the above-described shield layers 141U and 141L. However, the yoke 142 of the thermally assisted magnetic recording head according to the present invention is fabricated so as to generate a magnetic field applied to the recording medium in a gap between both of the magnetic poles 142U and 142L, and at the same time, function also as a so-called plasmon probe which causes the above-described near-field light in the vicinity of a surface of this recording medium. Near-field light is produced through plasmon resonance caused at the time when light (laser light) of visible light (wavelength band: 380 to 780 nm) passes through a pore space smaller than its wavelength, and locally heats a surface vicinity of the recording medium close to the pore space. The magnetic poles 142U and 142L exposed from a bottom surface (a x-z plane) of the slider 4 illustrated in FIG. 11C are separated in the z-axis direction, for example, by a gap (probe gap) 13G with a distance of 10 to 100 nm. When the magnetic poles 142U and 142L are formed by a material composed of a noble metal such as Au, Pt (platinum), and Ag, the plasmon resonance of light made incident into the gap 13G is easy to occur. Accordingly, "a part to which a signal is applied from the coil 143 (e.g., a part crossed by a B-B' line of FIG. 11A)" of the yoke 142 may be formed by the soft magnetic material. Further, in "a part which is exposed from the dielectric layers 11 and 12, and applies a magnetic signal to the recording medium, and to which near-field light is irradiated (e.g., a part crossed by a C-C' line of FIG. 11A)", a noble metal film may be formed on the soft magnetic material film to adjust the gap 13G. The above-described noble metal film may be used as a joint material between the upper magnetic pole 142U and lower magnetic pole 142L configuring the yoke 142.

With respect to a track of the magnetic disk (not illustrated) opposed to a bottom surface of the slider 4 in the vicinity of the C-C' line of FIG. 11A, information recorded on the track is read out by the read element 14R, and new information is written in the track by the write element 14W. On the other hand, in each of the other tracks (align in a radius direction of the magnetic disk with respect to the track), information recorded on the track is not read out by the read element 14R, and further new information is not written in the track by the write element 14W. That is, in a portion except a vicinity of the C-C' line of FIG. 11A, the read element 14R is not formed as illustrated by a broken frame (14R) in a cross sectional view of FIG. 11B. The yoke 142 of the write element 14W is also separated from a bottom surface (x-z plane) of the slider 4 opposed to the magnetic disk as illustrated in a cross sectional view of FIG. 11B. Further, a gap between both of the magnetic poles 142U and 142L is also wider than the above-described probe gap 13G in the vicinity of the C-C' line of FIG. 11A. This permits the slider 4 to selectively exchange magnetic signals to a specific track of the magnetic disk. Further, in the present embodiment, when laser light oscillated by the semiconductor laser element 100 is selectively guided to the near-field light generation element 13 (probe gap 13G) formed in the vicinity of the C-C' line of FIG. 11A, a recording density of information onto the magnetic disk is improved. For this purpose, in the slider 4 according to the present embodiment, glass ($SiO_2$ and so on) is used in place of normally-used alumina ($Al_2O_3$) as a material of the dielectric film (insulating film) 12 having embedded therein the magnetic field generation element 14. Further, an area 11 with a high refractive index is extended and formed in the inside in the y-axis direction (along the C-C' line) from the probe gap 13G. That is, supposing that the high refractive index area 11 in the dielectric film (insulating film) 12 is defined as a "core", an area with a low refractive index which surrounds the core is defined as a "clad", and light emitted from the semiconductor laser element 100 is confined in the core 11. Subsequently, one member to which a reference numeral 11 is given is described as the "core", and another member to which a reference numeral 12 is given is described as the "clad", respectively. The previously-described optical waveguide 3 is configured by the core 11 and the clad 12 which surrounds it.

When glass particles are deposited on a main surface of the base material 101 or on a structure formed thereon and when this deposited layer is heated at a high temperature, any of the core 11 and the clad 12 is made transparent and formed. As compared with the clad 12, the core 11 contains, at a high concentration, a dopant such as titanium oxide and germanium dioxide, and its refractive index is raised higher than that of the clad 12. In FIGS. 11A and 11C, light emitted from the semiconductor laser element 100 is made incident into the core 11 from an upper surface (x-z plane) of the slider 4 and propagates through the core 11 along with the y-axis direction, thus reaching the near-field light generation element 13 formed in the vicinity of the bottom surface of the slider 4. Light which reaches the near-field light generation element 13 causes the plasmon resonance at the probe gap 13G formed therein and is converted into near-field light, thereby locally heating the vicinity of a surface (an upper surface) of the magnetic disk.

According to the present embodiment, when the thermally assisted magnetic recording head has a configuration in which the active layer of the semiconductor laser element faces the substrate side, heat generated at the semiconductor laser element is easy to be conducted to the substrate and the heat dissipating characteristics are preferable. Further, since the semiconductor laser element is not directly mounted on the slider, the thermally assisted magnetic recording head can suppress a harmful effect such as an influence of a stress due to heat conduction to the slider.

As can be seen from the above description, there can be realized the thermally assisted magnetic recording head which can efficiently propagate light emitted from the semiconductor laser element through the optical waveguide while ensuring heat dissipating characteristics, and can ensure preferable floating characteristics when suppressing a warpage of the slider.

Second Embodiment

Figure 4:
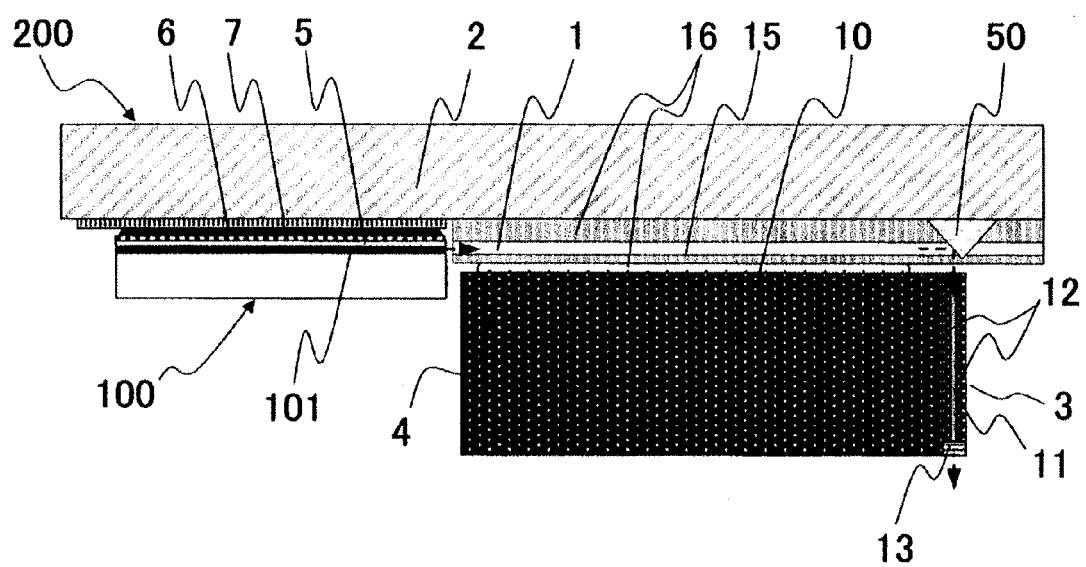
[FIG. 4] A schematic diagram illustrating a second embodiment of the present invention.

A second embodiment of the present invention will be described with reference to FIG. 4.

The present embodiment basically has the same configuration as that of the first embodiment illustrated in FIG. 1. The present embodiment differs from the first embodiment in a method for forming the mirror provided on the first optical waveguide 1. As illustrated in FIG. 4, the thermally assisted magnetic recording head has on the substrate 2 a protrusion 50 which has an inclined plane and in which a surface is formed by using a material reflecting laser light, such as metal, and further uses this protrusion 50 as the mirror when forming the optical waveguide thereon. As to an inclined plane angle of the protrusion 50, a conversion angle of a light beam is preferably from 60 to 120 degrees, and more preferably from 85 to 95 degrees. As a method for forming the protrusion 50, it may be formed by using metal, or it may be formed by using resins to be covered with a metallic thin film by using sputtering or plating. Also, as a method for forming the first optical waveguide 1, there may be used a method for sequentially laminating the undercladding layer/core pattern/overcladding layer or a method for attaching a film having formed thereon the core pattern to the cladding layers. When the mirror is previously formed on the substrate 2, a process of forming a groove by using dicing can be omitted.

Third Embodiment

Figure 5:
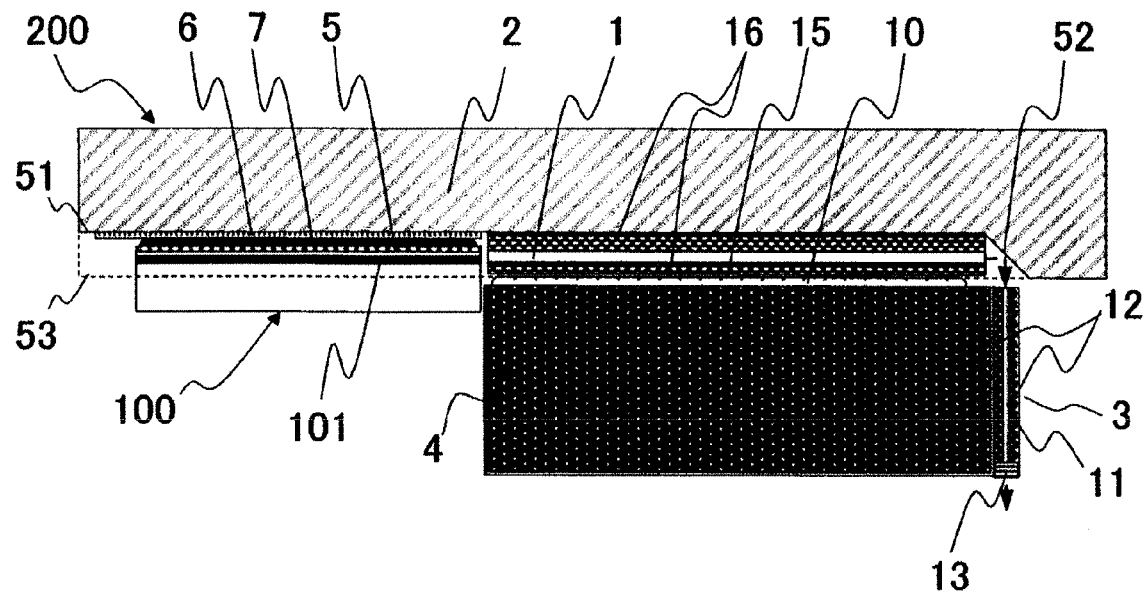
[FIG. 5] A schematic diagram illustrating a third embodiment of the present invention.

A third embodiment of the present invention will be described with reference to FIG. 5.

The present embodiment differs from the first embodiment illustrated in FIG. 1 in that the substrate 2 has a step structure, the semiconductor laser element 100 and the first optical waveguide 1 are formed on a bottom surface 51 of the step, and an inclined plane 52 of the step plays the role of the mirror to light propagated from the first optical waveguide 1. In the present embodiment, anisotropic etching of Si is used for formation of the step of the substrate 2. When using a process of using a Si substrate in which a substrate surface is the 100-plane, and anisotropically etching Si by KOH using $SiO_2$ as an etching mask, an angle of the inclined plane 52 of the step is equal to 54.7 degrees. As a result, the conversion angle of laser light which propagates in parallel with the substrate surface is equal to approximately 70 degrees. As a matter of course, the above-described method may be used; however, for the purpose of realizing more preferable mode in the present embodiment, an Si substrate in which a crystal orientation is shifted by 9 degrees is used. As a result, an angle of the inclined plane 52 formed due to the anisotropic etching is equal to approximately 45 degrees, and on the other hand, the conversion angle of laser light which propagates in parallel with the substrate surface is equal to approximately 90 degrees. As to a material of the substrate, SiC, $Al_2O_3$, AlN, and AlTiC except Si may be used. In that case, as a method for forming the inclined plane 52 of the step, it is formed by machining. On this occasion, in the inclined plane of the step, the conversion angle of a light beam is preferably from 60 to 120 degrees, and more preferably from 85 to 95 degrees.

As to an adhesive surface of the substrate 2 to the slider 4, any of the substrate surface and the overcladding surface of the optical waveguide may be used. As illustrated in FIG. 5, when the thermally assisted magnetic recording head has a configuration in which the step is provided only in the vicinity of the core pattern of the optical waveguide and the step is not provided in the vicinity of a side surface of the core pattern (etching is not performed), a thickness of the adhesive 10 can be minimized and heat dissipating characteristics can be preferable.

The formation of the other parts, such as the method for forming the first optical waveguide is performed in the same manner as in the first embodiment.

Fourth Embodiment

Figure 6:
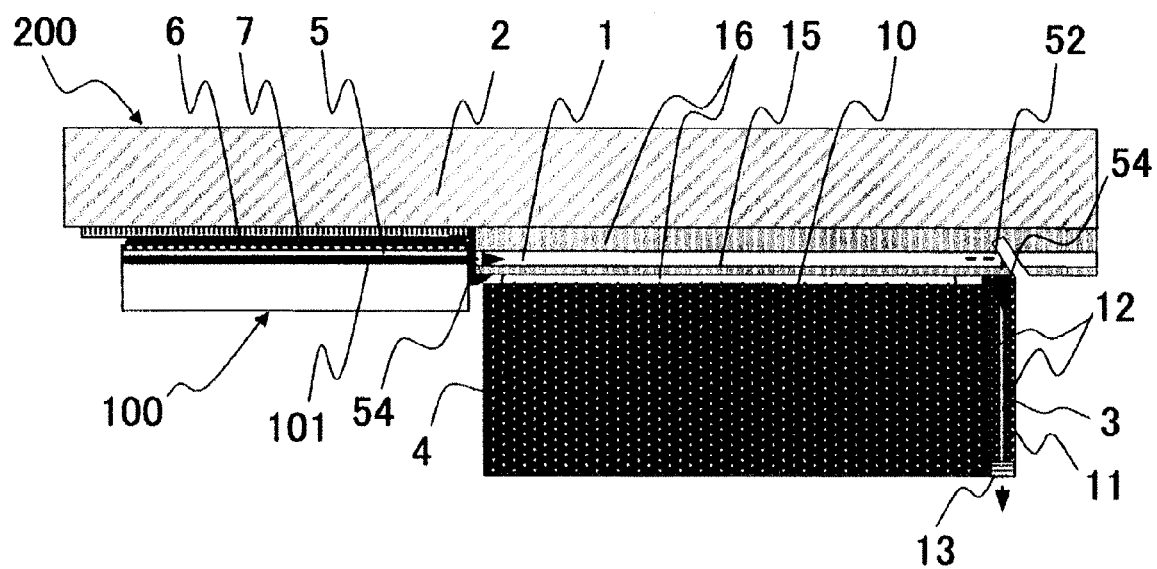
[FIG. 6] A schematic diagram illustrating a fourth embodiment of the present invention.

A fourth embodiment of the present invention will be described with reference to FIG. 6.

In the present embodiment, the thermally assisted magnetic recording head has a configuration in which a matching resin 54 having adjusted therein a refractive index is filled in one portion in which laser light emitted from the semiconductor laser element 100 is made incident into the first optical waveguide 1 and in another portion in which laser light emitted from the first optical waveguide 1 is made incident into the second optical waveguide 3. The above-described configuration permits a beam spread angle of an outgoing beam to be suppressed and further reflection of light at the incident portion to the optical waveguide to be suppressed. When a material having a refractive index approximated to that of the core pattern of the optical waveguide is used for the matching resin 54, the reflection can be preferably suppressed at the minimum.

In the present embodiment, the matching resin 54 is provided on two optical coupling portions; however, may be provided on any one of them. Further, in the present embodiment, a configuration according to the first embodiment is used, and as a matter of course, those according to the second and third embodiments may be used.

Fifth Embodiment

Figure 7:
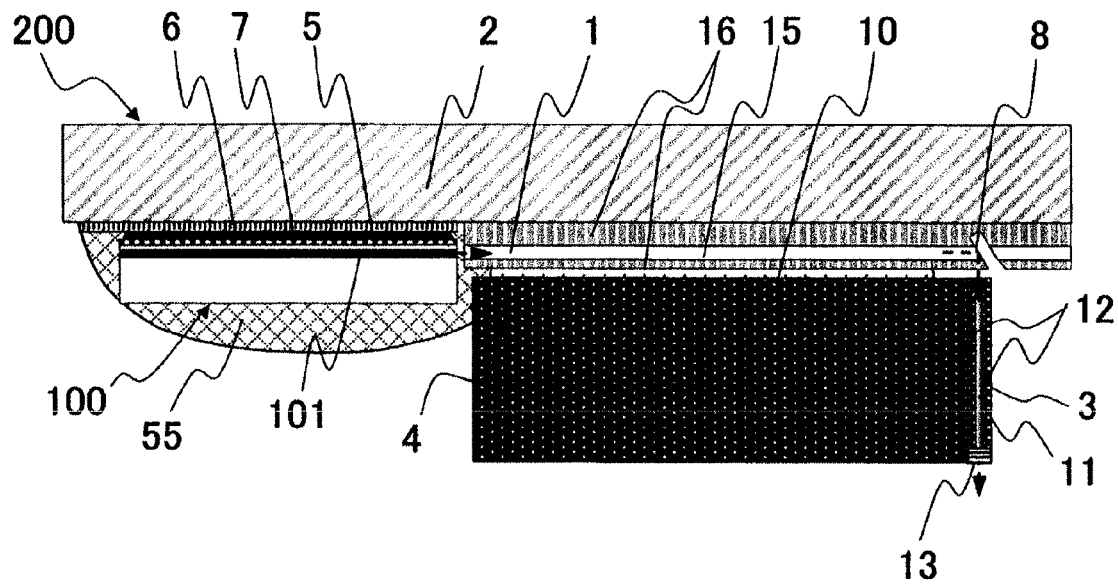
[FIG. 7] A schematic diagram illustrating a fifth embodiment of the present invention.

A fifth embodiment of the present invention will be described with reference to FIG. 7.

In the present embodiment, the thermally assisted magnetic recording head has a configuration in which the entire semiconductor laser element 100 is covered with a potting resin 55. As a result, a fear that minute dust with a size of several to several tens µm is caused by the semiconductor laser element is eliminated, and the possibility that a failure occurs in the reproducing and recording operations at the time of operating the hard disk is reduced. In the present embodiment, the potting resin 55 also including a function of the matching resin according to the fourth embodiment is used, and further, a mode of forming the matching resin according to the fourth embodiment and then forming the potting resin may be used. Further, in the present embodiment, a configuration according to the first embodiment is used, and as a matter of course, those according to the second and third embodiments may be used.

Sixth Embodiment

Figure 8:
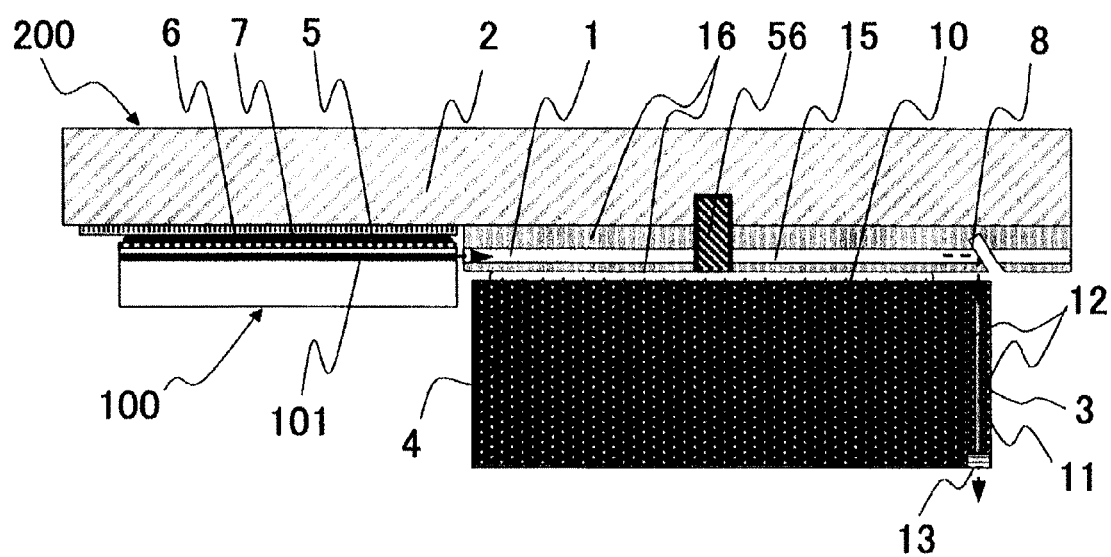
[FIG. 8] A schematic diagram illustrating a sixth embodiment of the present. invention.

A sixth embodiment of the present invention will be described with reference to FIG. 8.

In the present embodiment, the thermally assisted magnetic recording head has a configuration in which a half-wavelength plate 56 is inserted in the middle of the first optical waveguide 1. A groove is dug in the first optical waveguide 1, and then the half-wavelength plate 56 is inserted into the groove, and adhered thereto to thereby be fixed on the first optical waveguide 1. The polarizing direction of light emitted from the semiconductor laser element 100 can be rotated due to the presence of this half-wavelength plate 56. For example, in the case where the polarizing direction of light emitted from the semiconductor laser element 100 is set in parallel with a surface of the substrate 2, when an angle of deviation of the half-wavelength plate 56 with respect to a surface of the substrate 2 is set to 45 degrees, the polarizing direction of light can be converted to a surface of the substrate 2 in the vertical direction. When the above-described measures are taken, light can be irradiated onto a near-field probe in the optimal polarizing direction even by using a light source of any polarizing direction, and further the high-performance thermally assisted magnetic recording head can be provided. In addition, a method for fixing the half-wavelength plate may be used except for the above-described method. The half-wavelength plate may be installed in an incident end or exiting end of light of the first optical waveguide. Every optical functional element except the half-wavelength plate may be used. Further, in the present embodiment, a configuration according to the first embodiment is used, and as a matter of course, those according to the second and third embodiments may be used.

Seventh Embodiment

A seventh embodiment of the present invention will be described with reference to FIG. 9.

Figure 9:
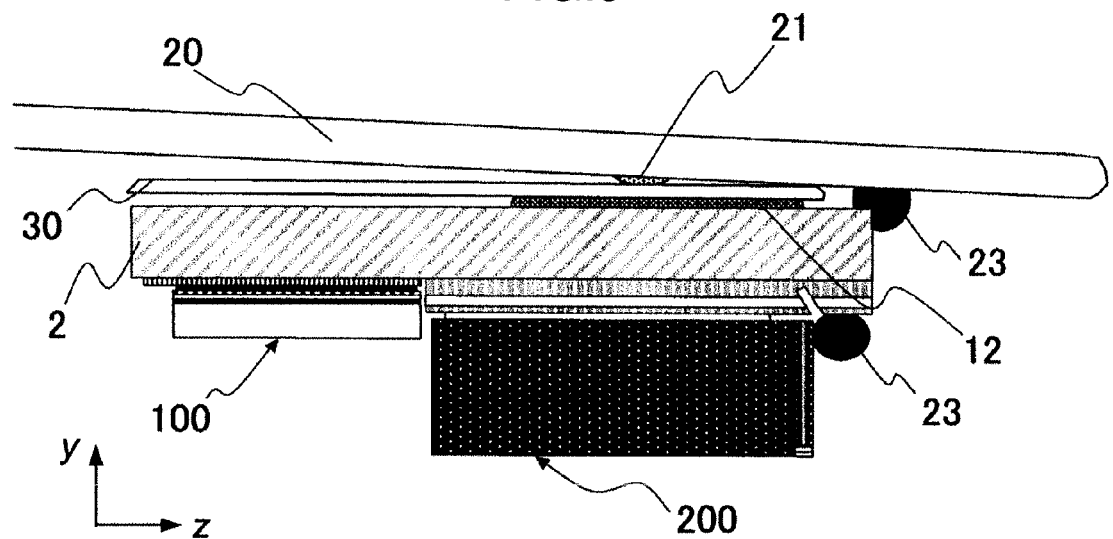
[FIG. 9] A schematic diagram illustrating a seventh embodiment of the present invention.

FIG. 9 is a schematic diagram illustrating a head gimbal assembly in which the substrate 2 is adhered and fixed to a suspension 20 which mechanically drives the thermally assisted magnetic recording head 200. The magnetic disk 31 moves in the z-axis direction of FIG. 9 during the rotation. The slider 4 receives an air current generated by movement of the magnetic disk 31 by its air bearing surface to obtain a floating force. Further, when receiving a stress from the slider 4 and bending, the suspension 20 keeps a distance between the thermally assisted magnetic recording head 200 and the magnetic disk 31 in a predetermined range.

Between the thermally assisted magnetic recording head 200 and the suspension 20, a gimbal spring (one type of plate springs) 33 is provided, and the head 200 and the gimbal spring 33 are adhered to each other by the adhesive 12. As to the adhesive 12 used for the above-described fixing, heat dissipation is preferably considered mainly and an adhesive with high thermal conductivity is preferably used. The adhesive 12 is formed on a surface of the opposite side corresponding to a position of the substrate 2 having mounted thereon the slider 4 and the optical waveguide 1, and the position end of the substrate 2 having mounted thereon the semiconductor laser element 4 is made to be a free end. Accordingly, even if heat from the semiconductor laser element 100 is conducted to thermally expand the substrate 2, the thermally assisted magnetic recording head 200 is designed not to exert an influence on a relative position between the suspension 20 and the head 200.

Between the suspension 20 and the gimbal spring 33, a dimple 21 is formed. The dimple 21 is preferably disposed near the center of the slider 4. In the case of the thermally assisted magnetic recording head, driving power is supplied to the magnetic field generation element 22 and the semiconductor laser element 100 through a lead line (not illustrated) provided on the suspension 20. For the purpose, the suspension 20 and the substrate 2, and the substrate 2 and the slider 4 need be electrically connected by using solder, respectively. On this occasion, a method for supplying solder balls 23 to electrode parts, and then irradiating laser light onto them to thereby make connection is used for the solder connection. As to the connection method, connection may be made by an ultrasonic bonding method using a ball made of for example, Au except solder. Further, in the present embodiment, a configuration according to the first embodiment is used, and as a matter of course, any one of those according to the second to sixth embodiments may be used.

Eighth Embodiment

An eighth embodiment of the present invention will be described with reference to FIG. 10.

Figure 10:
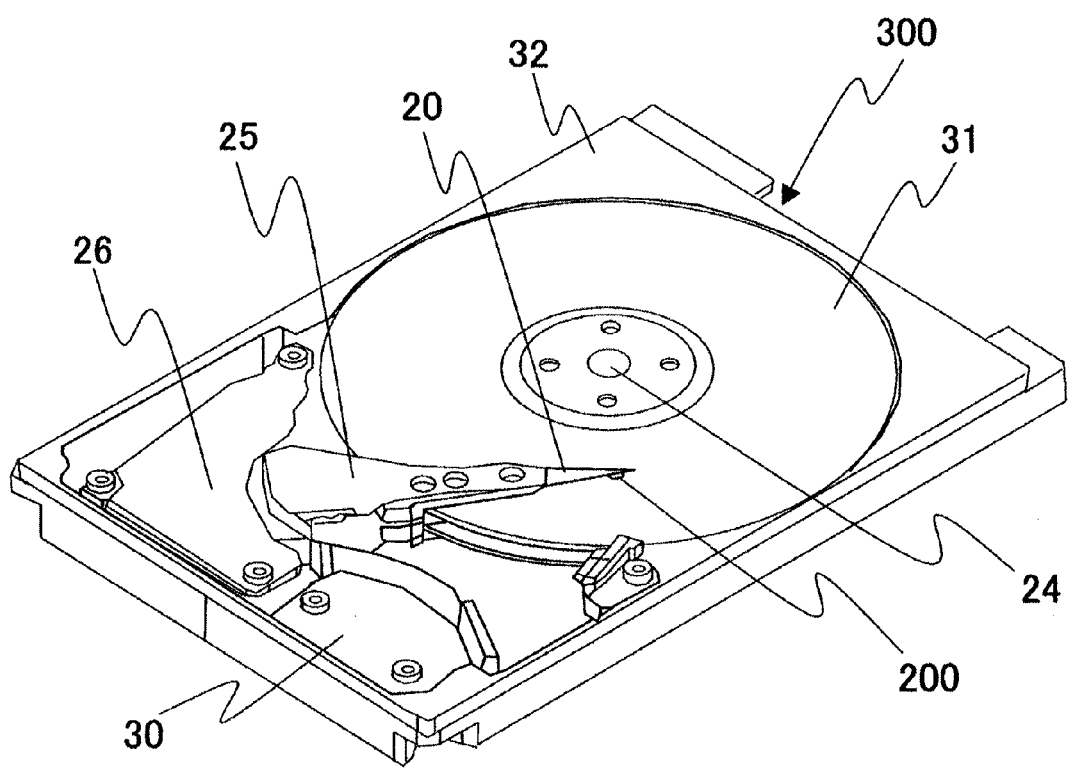
[FIG. 10] A schematic diagram illustrating an eighth embodiment of the present invention.

FIG. 10 is a schematic diagram illustrating a configuration of a hard disk drive apparatus 300 on which the thermally assisted magnetic recording head 200 according to the present invention is mounted. Within a chassis 32 of the hard disk drive apparatus 300, the magnetic disk 31 serving as a recording medium is disposed and rotated at high speed by a spindle motor 24. On one end of the suspension 20, the thermally assisted magnetic recording head 200 is mounted, and another end thereof is connected to an arm 25. As the thermally assisted magnetic recording head, any of those according to the first to sixth embodiments may be used. Further, as the head gimbal assembly, that according to the seventh embodiment may be used. The arm 25 is driven by a voice coil motor 26, and moves the thermally assisted magnetic recording head 200 to a position in which the rotating magnetic disk 31 performs a recording operation. Also, a signal processing LSI 30 which processes writing and reading information of the record data is disposed within the chassis 32.

When a writing operation is performed in the magnetic disk 31, the thermally assisted magnetic recording head 200 is moved to a position for performing a writing operation by the voice coil motor 26. Then, laser light emitted from the semiconductor laser element 100 propagates through the optical waveguides 1 and 3, and reaches the near-field light generation element 13 of the slider 4. The near-field light generation element 13 generates near-field light and locally heats a surface of the magnetic disk 31. When applying, by using the magnetic poles, a magnetic field to a place to which heat is applied and in which coercivity is weakened, the thermally assisted magnetic recording head 200 performs a recording operation in a weak magnetic force as compared with a case in which the head 200 is not used.

The present invention has been explained in detail and with reference to the specific embodiment. However, it is apparent for those skilled in the art that the present invention can be changed or modified in various manners without departing from the spirit and scope of the invention.

Industrial Applicability

According to the embodiments of the present invention, the semiconductor laser element can be disposed near the thermally assisted magnetic recording head and light can be propagated with high optical coupling efficiency, while ensuring heat dissipating characteristics and floating characteristics. As a result, the thermally assisted magnetic recording head with a compact configuration and capable of responding high density and high-speed recording operation can be realized.

REFERENCE SIGNS LIST

1 First optical waveguide
2 Substrate
3 Second optical waveguide
4 Slider
5 Electrode of semiconductor laser element
6 Electrode of substrate 2
7 Solder
8 Mirror
10, 11, 12 Adhesive
15 Core
16 Cladding layer
20 Suspension
21 Dimple
22 Near-field light generation element
23 Solder ball
24 Spindle motor
25 Arm
26 Voice coil motor
30 Signal processing LSI
31 Magnetic disk
32 Chassis 50, Protrusion
51 Bottom surface of step
52 Inclined surface of step
53 Top surface of step
54 Matching resin
55 Potting resin
56 Half-wavelength plate (Optical functional element)
100 Semiconductor laser element
101 Active layer of semiconductor laser element
200 Thermally assisted magnetic recording head
300 Hard disk drive apparatus

The invention claimed is:

1. A thermally assisted magnetic recording head comprising:

a substrate;

a semiconductor laser element which is provided on the substrate and generates laser light; and a slider including a near-field light generation element which receives the laser light and generates near-field light, a magnetic head which performs a recording operation, and an air bearing surface, wherein:

a first optical waveguide through which the laser light emitted is provided on the substrate;

a half-wavelength plate is provided within the first optical waveguide; and the slider is provided on the first optical waveguide, and has, on its end surface, a second optical waveguide which propagates, in a thickness direction of the slider, the laser light propagating through the first optical waveguide and guides it to the near-field light generation element.

2. The thermally assisted magnetic recording head according to claim 1,
wherein a mirror which converts a propagation direction of the laser light propagating through the first optical waveguide is provided on the substrate or the first optical waveguide.

3. The thermally assisted magnetic recording head according to claim 2,
wherein an angle of the mirror for converting a propagation direction of the laser light varies between 60 and 120 degrees.

4. The thermally assisted magnetic recording head according to claim 1,
wherein near-field light generation element is disposed on an air bearing surface end and near part thereof of the second optical waveguide.

5. The thermally assisted magnetic recording head according to claim 1,
wherein the semiconductor laser element is located, with respect to the slider, at the side opposite to an end surface on which the second optical waveguide is provided.

6. The thermally assisted magnetic recording head according to claim 2,
wherein a groove is formed in a material for forming the first optical waveguide or the material is cut, thereby forming the mirror.

7. The thermally assisted magnetic recording head according to claim 6,
wherein a film is attached to the first optical waveguide, thereby forming the mirror.

8. The thermally assisted magnetic recording head according to claim 2,
wherein:
the substrate has a protrusion; and
the first optical waveguide is formed on the protrusion, thereby forming the mirror.

9. The thermally assisted magnetic recording head according to claim 1,
wherein both of a p electrode and n electrode of the semiconductor laser element are provided on a surface of an active layer side.

10. The thermally assisted magnetic recording head according to claim 1,
wherein an optical functional element is disposed at any one of an end, middle, and mirror of the first optical waveguide.

11. The thermally assisted magnetic recording head according to claim 1,
wherein a heat dissipating material or an adhesive with high thermal conductivity is filled in at least a part between the substrate and the slider.

12. The thermally assisted magnetic recording head according to claim 1,
wherein a resin with a refractive index more than one is filled between the first and second optical waveguides.

13. The thermally assisted magnetic recording head according to claim 1,
wherein at least part or the entire surface of the semiconductor laser element is covered with resins.

14. A head gimbal assembly comprising:
the thermally assisted magnetic recording head according to claim 1; and
a suspension,
wherein the thermally assisted magnetic recording head is fixed on the suspension on the slider side of the substrate.

15. A magnetic disk apparatus comprising:
a chassis;
a magnetic disk;
a motor which rotates the magnetic disk;
a head gimbal assembly according to claim 14 which performs a recording operation on the magnetic disk; and
an arm which moves the head gimbal assembly.

* * * * *